United States Patent
Nakano et al.

(10) Patent No.: US 11,329,294 B2
(45) Date of Patent: May 10, 2022

(54) LAMINATED ELECTROLYTE MEMBRANE, MEMBRANE ELECTRODE ASSEMBLY, WATER ELECTROLYSIS CELL, STACK, WATER ELECTROLYZER, AND HYDROGEN UTILIZING SYSTEM

(71) Applicant: Kabushiki Kaisha Toshiba, Minato-ku (JP)

(72) Inventors: Yoshihiko Nakano, Yokohama (JP); Norihiro Yoshinaga, Yokohama (JP); Wu Mei, Yokohama (JP); Taishi Fukazawa, Ota (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 21 days.

(21) Appl. No.: 16/128,635

(22) Filed: Sep. 12, 2018

(65) Prior Publication Data

US 2019/0296364 A1    Sep. 26, 2019

(30) Foreign Application Priority Data

Mar. 22, 2018   (JP) .............................. JP2018-054822
Sep. 7, 2018    (JP) .............................. JP2018-167962

(51) Int. Cl.
*H01M 4/88* (2006.01)
*H01M 4/92* (2006.01)
(Continued)

(52) U.S. Cl.
CPC ............... *H01M 4/881* (2013.01); *C25B 1/04* (2013.01); *C25B 9/73* (2021.01); *C25B 13/08* (2013.01);
(Continued)

(58) Field of Classification Search
CPC .......... H01M 4/86–4/96; H01M 4/881; H01M 8/1004; H01M 8/241; H01M 4/92;
(Continued)

(56) References Cited

U.S. PATENT DOCUMENTS 5,472,799 A   12/1995  Watanabe et al.
5,766,787 A    6/1998  Watanabe et al.
(Continued)

FOREIGN PATENT DOCUMENTS

JP   06-103992   4/1994
JP   07-090111   4/1995
(Continued)

OTHER PUBLICATIONS

Yan, S., et al., "Effects of Nafion Membrane Modification on Oxygen Purity in PEM Water Electrolyzer", Space Medicine & Medical Engineering, Oct. 2013, pp. 391-393 (previously filed, submitting English translation only).

(Continued)

*Primary Examiner* — Carlos Barcena
(74) *Attorney, Agent, or Firm* — Oblon, McClelland, Maier & Neustadt, L.L.P.

(57) ABSTRACT

A laminated electrolyte membrane of an embodiment includes: a first electrolyte membrane; a second electrolyte membrane; and a nanosheet laminated catalyst layer provided between the first electrolyte membrane and the second electrolyte membrane and including a laminated structure in which a plurality of nanosheet catalysts is laminated with a gap.

20 Claims, 8 Drawing Sheets

(51) Int. Cl.
*H01M 8/1004* (2016.01)
*H01M 8/241* (2016.01)
*C25B 13/08* (2006.01)
*C25B 1/04* (2021.01)
*C25B 9/73* (2021.01)
*H01M 8/1041* (2016.01)

(52) U.S. Cl.
CPC ............ *H01M 4/92* (2013.01); *H01M 8/1004* (2013.01); *H01M 8/241* (2013.01); *H01M 8/1055* (2013.01); *H01M 2300/0082* (2013.01); *H01M 2300/0094* (2013.01); *Y02E 60/36* (2013.01); *Y02E 60/50* (2013.01)

(58) Field of Classification Search
CPC ....... H01M 8/1055; H01M 2300/0082; H01M 2300/0094; C25B 13/08; C25B 1/04; C25B 9/73; Y02E 60/36; Y02E 60/50
See application file for complete search history.

(56) References Cited

U.S. PATENT DOCUMENTS

| | | | |
|---|---|---|---|
| 2003/0235737 | A1 | 12/2003 | Jeon et al. |
| 2013/0252132 | A1* | 9/2013 | Mei .................... H01M 4/8657 429/482 |
| 2015/0236354 | A1 | 8/2015 | Binder et al. |
| 2016/0087282 | A1* | 3/2016 | Mei .................... H01M 4/8621 429/482 |
| 2017/0033387 | A1* | 2/2017 | Umeda ............... H01M 8/1039 |
| 2017/0077539 | A1* | 3/2017 | Mei .................... H01M 8/1004 |
| 2020/0099061 | A1* | 3/2020 | Price ........................ C25B 9/10 |

FOREIGN PATENT DOCUMENTS

| | | |
|---|---|---|
| JP | 3271801 | 4/2002 |
| JP | 3375200 | 2/2003 |
| JP | 2005-530330 | 10/2005 |
| JP | 2012-204221 A | 10/2012 |
| JP | 2014-523965 A | 9/2014 |
| JP | 2016-505193 | 2/2016 |
| JP | 2017-41379 A | 2/2017 |
| JP | 2017-115232 A | 6/2017 |

OTHER PUBLICATIONS

Masahiro Watanabe, et al. "Self-Humidifying Polymer Electrolyte Membranes for Fuel Cells," Journal of Electrochem. Soc. vol. 143, No. 12, Dec. 1996, pp. 3847-3852.
Shi Yan, et al., "Effects of Nafion Membrane Modification on Oxygen Purity in PEM Water Electrolyzer," Space Medicine & Medical Engineering, 2016, pp. 391-393 (with English Abstract).
Shi Yan, et al., "Effects of Nafion Membrane Modification on Oxygen Purity in PEM Water Electrolyzer," Space Medicine & Medical Engineering. 2013. pp. 391-393 (with English Abstract).

\* cited by examiner

LAMINATED ELECTROLYTE MEMBRANE, MEMBRANE ELECTRODE ASSEMBLY, WATER ELECTROLYSIS CELL, STACK, WATER ELECTROLYZER, AND HYDROGEN UTILIZING SYSTEM

CROSS-REFERENCE TO RELATED APPLICATION

This application is based upon and claims the benefit of priority from Japanese Patent Applications No. 2018-54822, filed on Mar. 22, 2018 and No. 2018-167962, filed on Sep. 7, 2018; the entire contents of which are incorporated herein by reference.

FIELD

Embodiments described herein relate to a laminated electrolyte membrane, a membrane electrode assembly, a water electrolysis cell, a stack, a water electrolyzer, and a hydrogen utilizing system.

BACKGROUND

Presently, fuel cells are attracting attention and being developed as a clean power generation system that can reduce environmental burdens. Particularly, fuel cells are beginning to be used in various fields such as household power supply use, onboard use, and so on. On the other hand, in order to prevent global warming, it is essential to reduce $CO_2$ emissions as measures against global warming, and the use of renewable energy such as solar cells and wind power generators has been actively utilized as clean energy that does not emit $CO_2$. The amount of such renewable energy that can be generated is greatly influenced by weather and the like and thus, renewable energy is being studied as a stable supply system of power by storage in secondary batteries or conversion to chemical energy by compound synthesis.

In recent years, a "hydrogen society" has been proposed in a clean energy supply system that produces hydrogen from renewable energy and generates power using a fuel cell. From the above, hydrogen attracts attention as a means of converting electric energy into a compound (chemical energy), and as a method for producing hydrogen, alkaline water electrolysis, polymer electrolyte membrane (PEN) water electrolysis, solid oxide electrolysis cell (SOEC), and the like are known and recently, PEN water electrolysis has been extensively studied as highly efficient water electrolysis.

For example, in a PEN water electrolyzer, platinum group metals are bonded to both sides of a solid polymer electrolyte membrane (fluororesin type cation exchange membrane) so as to be integrated with the membrane, with one side thereof set as an anode and the other as a cathode. When a DC voltage is applied between both electrodes while supplying water to the anode side, an oxygen gas is generated from the anode and a hydrogen gas is generated from the cathode and the polymer electrolyte membrane functions as a diaphragm so that the generated hydrogen gas and oxygen gas can be taken out separately.

In order to improve the performance of PEN type water electrolysis, it is necessary to improve only the proton conductivity of the electrolyte membrane so that the membrane resistance needs to be reduced. However, if the electrolyte membrane is thinned to improve the proton conductivity, the membrane resistance is reduced. However, an oxygen crossover from the anode to the cathode and a hydrogen crossover from the cathode to the anode increase greatly. When the crossover increases, a reaction with the electrode occurs and the electromotive force decreases. Therefore, an electrolyte membrane having low crossover and low membrane resistance is required.

DETAILED DESCRIPTION

A laminated electrolyte membrane of an embodiment includes: a first electrolyte membrane; a second electrolyte membrane; and a nanosheet laminated catalyst layer provided between the first electrolyte membrane and the second electrolyte membrane and including a laminated structure in which a plurality of nanosheet catalysts is laminated with a gap.

Hereinafter, the embodiments of the present disclosure will be described in detail with reference to the drawings. In the description that follows, the same members and the like are denoted with the same reference numerals, and the description of the members etc. once described is omitted as appropriate.

First Embodiment

Figure 1:
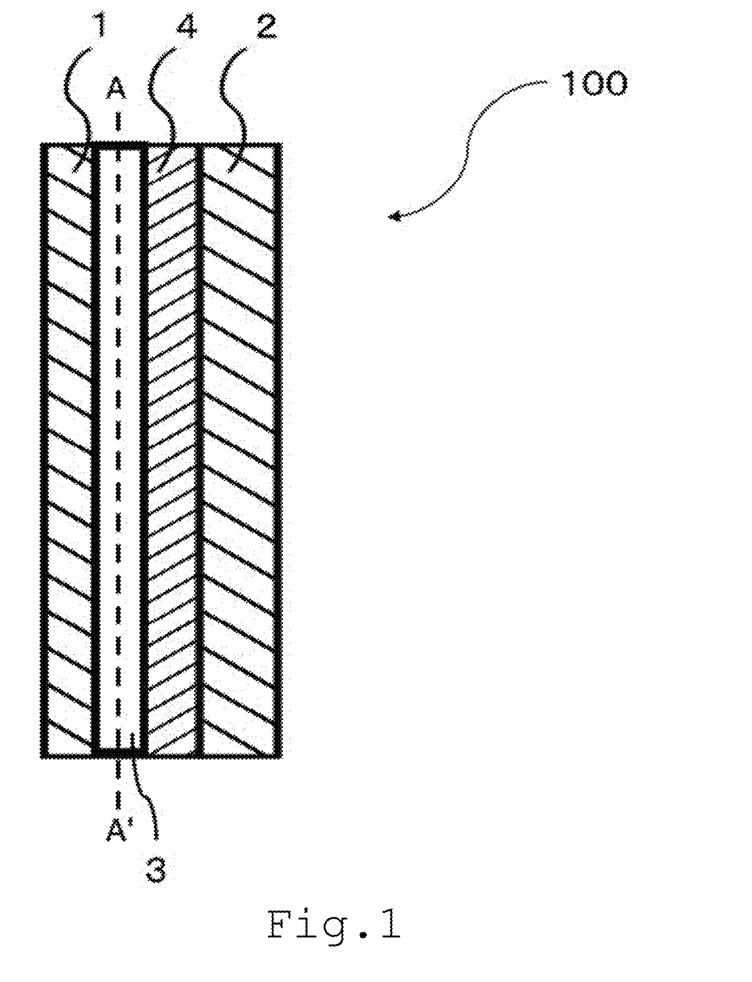
FIG. 1 is a sectional view of a laminated electrolyte membrane according to a first embodiment.

FIG. 1 is a sectional view of a laminated electrolyte membrane 100 according to the first embodiment.

In the laminated electrolyte membrane 100 in the first embodiment, an electrolyte membrane 1 (also referred to as a first electrolyte membrane), a nanosheet laminated catalyst layer 3, a transfer layer 4, and an electrolyte membrane 2 (also referred to as a second electrolyte membrane) are sequentially laminated. For the electrolyte membranes 1 and 2 used for the laminated electrolyte membrane 100, a perfluorosulfonic acid based electrolyte membrane or a hydrocarbon based sulfonic acid based electrolyte membrane can be used. When used as an electrolyte membrane for water electrolysis, the laminated electrolyte membrane 100 in the embodiment is preferable in view of low membrane resistance of the laminated electrolyte membrane and low crossover.

The laminated electrolyte membrane 100 shown in FIG. 1 has the electrolyte membranes 1 and 2, the nanosheet laminated catalyst layer 3 provided between the electrolyte membrane 1 and the electrolyte membrane 2 and containing a catalyst and voids, and the transfer layer 4 provided between the electrolyte membrane 2 and the nanosheet laminated catalyst layer 3 to bond the electrolyte membrane 2 and the nanosheet laminated catalyst layer 3. The electrolyte membrane 1 and the electrolyte membrane 2 of the laminated electrolyte membrane may be the same electrolyte or different.

The thickness of the laminated electrolyte membrane 100 is preferably 20 µm or more and 400 µm or less. Here, the "thickness" indicates the average thickness in the lamination direction. The average thickness indicates an average thickness calculated using a sectional view observed with a scanning electron microscope (SEM). The "lamination direction" indicates the direction from the electrolyte membrane 1 to the electrolyte membrane 2 at the shortest distance. If the thickness of the laminated electrolyte membrane 100 is less than 20 µm, the membrane is thin and so the mechanical strength and durability are degraded, which is not preferable, and if the thickness of the laminated electrolyte membrane 100 exceeds 400 µm, the membrane resistance is large and the efficiency of water electrolysis is degraded, which is not preferable. For the reasons described above, the thickness of the laminated electrolyte membrane 100 is more preferably 25 µm or more and 250 µm or less.

The electrolyte membranes 1 and 2 are layers conducting ions (protons) and electrically insulated. In addition, the thickness of each of the electrolyte membranes 1 and 2 is preferably 1 µm or more and 390 µm or less, more preferably 2 µm or more and 150 µm or less. As the electrolyte, it is preferable to use a perfluorosulfonic acid based electrolyte, and the thicknesses of the electrolyte membranes 1 and 2 may be the same or different.

The perfluorosulfonic acid based electrolyte is preferably a polymer having an acidic group such as a sulfonic acid group or a sulfonimide group in the fluorine-containing main chain skeleton. For example, the perfluorosulfonic acid based electrolyte is exemplified by Nafion (trademark, manufactured by Du Pont), Aquivion (trademark, manufactured by Solvay Inc.), Flemion (trademark, manufactured by Asahi Kasei Corporation), and Aciplex (trademark, manufactured by Asahi Glass Co., Ltd.).

Further, in order to increase the mechanical strength of these electrolyte membranes, an electrolyte membrane reinforced with a porous membrane may be used. Specific porous membranes include, but are not limited to, PTFE (polytetrafluoroethylene), PEEK (polyetheretherketone), PP (polypropylene), glass fiber nonwoven fabric, glass paper, and the like.

The nanosheet laminated catalyst layer 3 is provided to suppress crossover of hydrogen and oxygen. The nanosheet laminated catalyst layer 3 includes a laminated structure constituted by a catalyst. The nanosheet laminated catalyst layer 3 is preferably a porous laminated structure spreading out in a planar form. That is, the nanosheet laminated catalyst layer 3 converts hydrogen and oxygen that enter into water by a chemical reaction of $H_2 + 1/2 O_2 \rightarrow H_2O$. The thickness of the nanosheet laminated catalyst layer 3 is preferably 10 nm or more and 2000 nm or less in order to sufficiently suppress crossover. If the thickness of the nanosheet laminated catalyst layer 3 is less than 10 nm, it is difficult to maintain the laminated structure, and if the thickness exceeds 2000 nm, the proton conductivity decreases, which is not preferable.

Figure 2A:
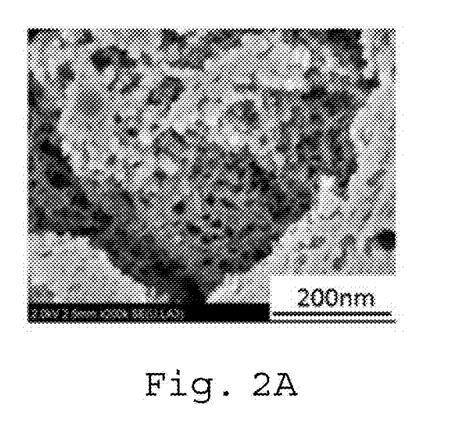
FIGS. 2A to 2D are photographs showing the structure of a nanosheet laminated catalyst layer.
Figure 2B:
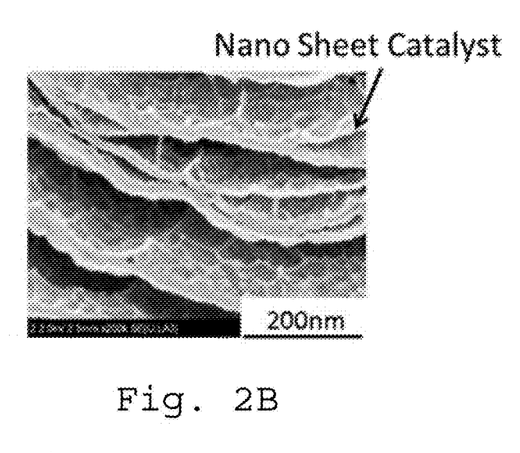
Figure 2C:
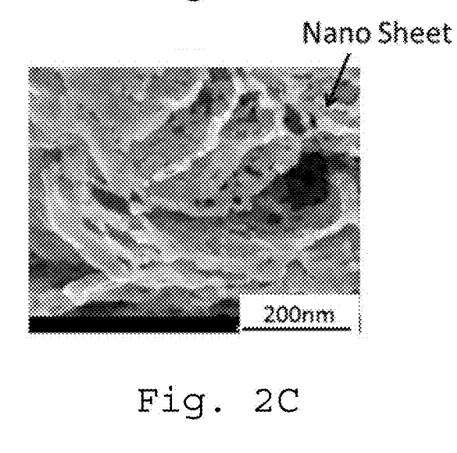
Figure 2D:
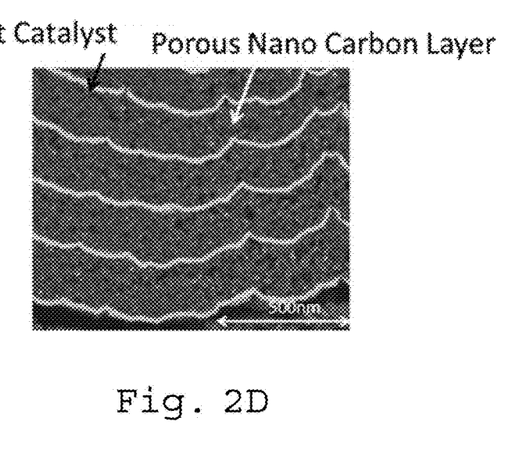

FIGS. 2A to 2D are photographs showing the structure of the nanosheet laminated catalyst layer 3. As shown in FIGS. 2A and 2B, the nanosheet laminated catalyst layer 3 is carrier-less and is a laminated structure including a catalyst having a porous structure and voids. Carrier-less means that a carrier is not used for the catalyst. FIG. 2A shows a catalyst having a porous structure, and FIG. 2B shows a laminated structure containing the catalyst and voids. As shown in FIG. 2A, when the catalyst has a porous structure, the catalyst itself is sponge-like. As shown in FIG. 2B, in the laminated structure containing the catalyst and voids, the catalyst is formed in a nanosheet form. In addition, the nanosheet-like catalyst and voids are alternately stacked in the lamination direction. That is, it can be said that a laminated structure in which a plurality of nanosheet catalysts is stacked with a gap is formed. In the case of a laminated structure containing a catalyst and voids, adjacent nanosheets are preferably integrated partially. This is because proton conduction or hydrogen atom conduction can thereby be made smoother. In addition, proton conduction or hydrogen atom conduction can be further improved by making, as shown in FIG. 2C, the nanosheet of the laminated structure porous. Further, when porous nano-carbon containing fibrous carbon (FIG. 2D) or nanoceramics is arranged in a void portion, durability is improved.

Here, conductivity of protons, water, and the like becomes smoother and thus, the laminated structure is preferably a structure having a high porosity. Also, the laminated structure has a large number of voids inside. When the catalyst is made of particles, for example, it is necessary to arrange the catalyst particles in a layer with high density in order to lower the crossover. However, particles arranged in the electrolyte membrane are extremely small nano-sized particles and are aggregated when arranged at a high density and so particles are locally present and it becomes easy for $H_2$ to pass through the particles, which makes it difficult to lower the crossover. Even if the particles can be dispersed at a high density, the ratio occupied by particles of the catalyst in the layered region where the catalyst is arranged is very high so that the conductivity of protons decreases. Therefore, it is not possible to arrange a particulate and non-porous catalyst in layers in an electrolyte membrane. That is, particles of a particulate catalyst can be arranged in an island shape, but cannot be arranged such that the particles are connected in layers. On the other hand, in the embodiment, the laminated structure becomes like a wall and the crossover can be lowered. Then, the laminated structure contains a large number of voids and thus, conduction of protons, water, and the like is smooth and membrane resistance does not increase.

From this viewpoint, the vacancy area ratio of the laminated structure is preferably 50% or more and 90% or less. Further, the vacancy area ratio of the laminated structure is more preferably 60% or more and 80% or less. The porosity of a laminated structure means the ratio of an area inside the laminated structure of the nanosheet laminated catalyst layer 3 that is not in contact with the electrolyte membranes 1 and 2 ([the area of the region not in contact with the electrolyte membranes 1 and 2 inside the laminated structure of the nanosheet laminated catalyst layer 3]/[the area of the nanosheet laminated catalyst layer 3]). When fibrous carbon-containing porous nano-carbon or nanoceramics is arranged in the voids of the laminated structure, fibrous carbon-containing porous nano-carbon or nanoceramics is regarded as a void of the laminated structure. In addition, if the porosity of the catalyst is within this range, the substance can be sufficiently conducted without lowering the utilization efficiency of noble metal.

For the area ratio of the region not in contact with the electrolyte membranes 1 and 2 in the laminated structure of the nanosheet laminated catalyst layer 3, the cross section of the nanosheet laminated catalyst layer 3 in a direction perpendicular to the cross section in FIG. 1 is observed from an imaginary line (broken line) of A-A' in FIG. 1 with a scanning electron microscope (SEM). Because the nanosheet laminated catalyst layer 3 is thin, if a portion of the cross section is the nanosheet laminated catalyst layer 3, only the portion that is the nanosheet laminated catalyst layer 3 is observed. The vacancy area ratio can be determined from the contrast of the observation image. From the observation image, it can also be verified that the nanosheet laminated catalyst layer 3 has a structure spreading in a plane rather than an island-shaped catalyst. When water is contained in the laminated structure, the area ratio is determined by regarding water as a void.

The catalyst used for the nanosheet laminated catalyst layer 3 may be any catalyst as long as the catalyst serves as a reaction catalyst for hydrogen and oxygen and, for example, a catalyst of Pt or an alloy containing at least Pt and having a composition represented by $Pt_uM_{1-u}$ is preferable. Here, u is in the range of $0<u<1$ and the element M is at least one selected from a group including Co, Ni, Fe, Mn, Ta, W, Hf, Si, Mo, Ti, Zr, Nb, V, Cr, Al, and Sn. In this alloy catalyst, Pt of more than 0 atom % and 90 atom % or less and the element M of 10 atom % or more and less than 100 atom % are contained. The amount of Pt in the catalyst is preferably in the range of 0.01 to 0.50 $mg/cm^2$. If the amount of Pt is less than 0.02 mg/cm', the effect of reducing the crossover is low and if the amount of Pt is 0.50 mg/cm' or more, the membrane resistance increases. When the metal catalyst described above is used, high durability can be maintained even if the amount of use thereof is small.

The content of the catalyst is analyzed such that the element distribution is observed by analyzing contained elements and the contents by inductively coupled plasma mass spectrometry (ICP-MS) and performing mapping by scanning electron microscope/energy dispersive x-ray spectroscopy (SEM-EDX). In addition, an X-ray diffraction apparatus is preferably used to identify oxides.

Figure 3:
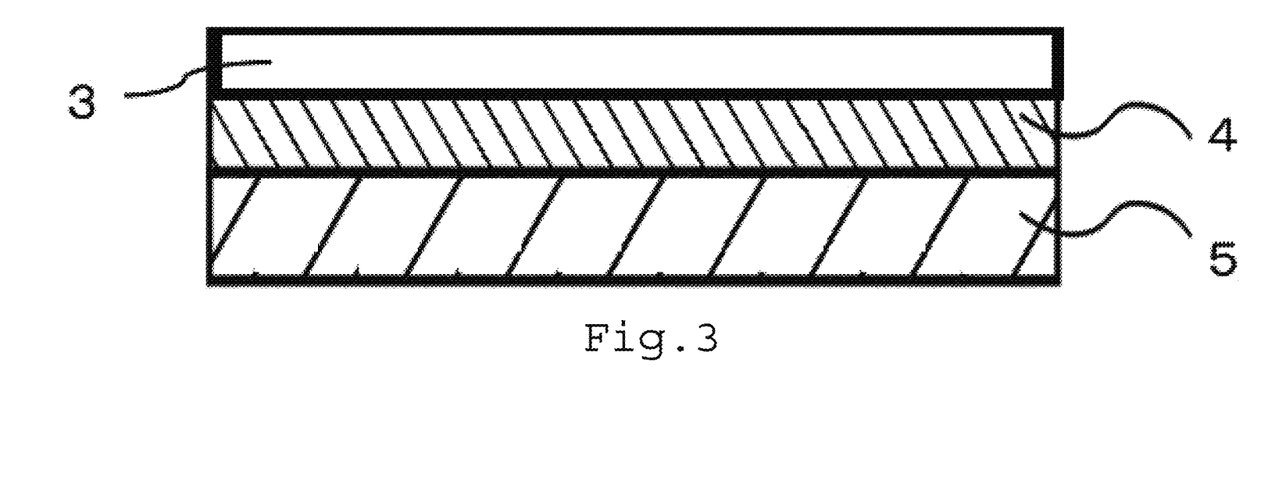
FIG. 3 is a diagram showing a method of manufacturing the nanosheet laminated catalyst layer.

A method for producing the nanosheet laminated catalyst layer 3 will be described using FIG. 3. As shown in FIG. 3, the transfer layer 4 is formed on a substrate 5, Pt or a Pt alloy and a metal soluble with an acid or an alkali are alternately laminated by sputtering thereon and then, the metal soluble with an acid or an alkali is dissolved to produce the nanosheet laminated catalyst layer 3. After producing the nanosheet laminated catalyst layer 3, the substrate 5 is peeled off and removed.

The transfer layer 4 is provided to couple the electrolyte membrane 2 and the nanosheet laminated catalyst layer 3. Any method for producing the transfer layer 4 may be used to produce the transfer layer 4 on the substrate 5 and more specifically, a substrate is coated with a dispersed solution containing only inorganic nanoparticles, a polymer solution, a dispersion liquid of inorganic nanoparticles containing a binder (polymer), and the like and the solutions and the like are dried to produce the transfer layer 4. The thickness of the transfer layer 4 is preferably 0.1 μm or more and 15 μm or less. If the thickness exceeds 15 μm, protons are less likely to be transmitted, which is not preferable because resistance of the laminated electrolyte membrane 100 increases. On the other hand, if the thickness is less than 0.1 μm, the catalyst of the nanosheet laminated catalyst layer 3 is also undesirably peeled off together with the substrate 5 when the substrate 5 is peeled off, which is not preferable. On the other hand, the polymer and binder to be used may be any ones that can withstand process conditions below. More specifically, the perfluorosulfonic acid based electrolyte (which may be the same as or different from the electrolyte used for the electrolyte membranes 1 and 2), polybenzothiazole (PBT), polybenzoxazole (PBO), polybenzo imidazole (PBI), and the like can be cited, but the polymer and binder are not limited thereto. The coating method of the transfer layer 4 may be any method capable of coating and examples thereof include a spin coating method, a blade coating method, an inkjet method, a gravure method, a spray coating method, and the like, but are not limited thereto. Drying of the coated film is performed by heating and the temperature thereof is preferably 60° C. or more and less than 250° C.

The drying time can be adjusted by the solvent used and the thickness of the electrolyte. If the temperature is less than 60° C., the solvent will not be sufficiently volatilized and if the temperature is 250° C. or more, the polymer membrane (binder) may be decomposed.

The laminated electrolyte membrane 100 is formed by, after transferring the nanosheet laminated catalyst layer 3 (the transfer layer 4 is also transferred at the same time) onto the electrolyte membrane 1, forming the electrolyte membrane 2 by bonding the electrolyte membrane 2 onto the transfer layer 4 or coating the transfer layer 4 with an electrolyte solution.

The coating method of the electrolyte membrane 2 may be any method capable of coating and examples thereof include a spin coating method, a blade coating method, an inkjet method, a gravure method, a spray coating method, and the like, but are not limited thereto. Drying of the coated film is performed by heating and the temperature thereof is preferably 60° C. or more and less than 250° C.

The drying time can be adjusted by the solvent used and the thickness of the electrolyte membrane. If the temperature is less than 60° C., the solvent will not be sufficiently volatilized and if the temperature is 250° C. or more, the polymer membrane (binder) may be decomposed.

When the transfer layer 4 and the electrolyte membrane 2 are bonded, temperature and pressure are applied. The electrolyte membrane 2 to be bonded may be in a state sufficiently swollen with water or in a dry state. The transfer temperature and the bonding temperature are preferably in the range of 80 to 200° C., particularly preferably in the range of 120 to 180° C. Pressurization should be less than 50 $kg/cm^2$ if pressurization is done by, for example, hot pressing. If pressurization is 50 $kg/cm^2$ or more, there is a possibility that the mechanical strength is lowered. In addition, a method by a roll method can be applied as a pressurizing, heating, and drying method.

The substrate 5 may be any substrate that withstands the transfer temperature at the time of transfer and is stable to an aqueous solution of acid and alkali to some extent and more specifically, carbon, a polyimide film, a polyamide film, a PTFE film, a PEN film, and the like can be cited, but the substrate is not limited thereto.

In the laminated electrolyte membrane 100 according to the first embodiment, the nanosheet laminated catalyst layer 3 is provided between the electrolyte membrane 1 and the electrolyte membrane 2. When the laminated electrolyte membrane 100 is used as an electrolyte membrane for water electrolysis, the nanosheet laminated catalyst layer 3 shields gases such as hydrogen and oxygen, thereby suppressing crossover. In addition, the thickness of the nanosheet laminated catalyst layer 3 is smaller than the thickness of the laminated electrolyte membrane 100 and thus, a laminated electrolyte membrane having a low membrane resistance that does not inhibit the proton conductivity is obtained. The thickness of the nanosheet laminated catalyst layer 3 with respect to the thickness of the laminated electrolyte membrane 100 ([thickness of the laminated electrolyte membrane 100]/[thickness of the nanosheet laminated catalyst layer 3]) is preferably 0.01/1000 to 0.5/1000.

Note that the laminated electrolyte membrane 100 may have a film to which an additive for increasing chemical durability is added. Examples of the additives include a radical scavenger and a radical decomposer. For example, an organic phosphorous compound, an aromatic amine compound, a phenol compound, a thioether compound, $CeO_2$, $MnO_2$, and the like can be cited as additives. The radical scavenger or the hydrogen peroxide decomposer may be contained in a ratio of 0% by mass or more and 10% by mass or less. Regardless of the example in FIG. 1, the substrate 5 may be provided instead of the transfer layer 4. In such a case, for example, by using glass paper (which may be a porous inorganic material) as the substrate 5, the transfer layer 4 becomes unnecessary with the glass paper acting as a reinforcing agent for the electrolyte membrane 2.

In addition, irrespective of the example in FIG. 1, the electrolyte membrane 1 may be in contact with the transfer layer 4, instead of the electrolyte membrane 2.

Second Embodiment

Figure 4:
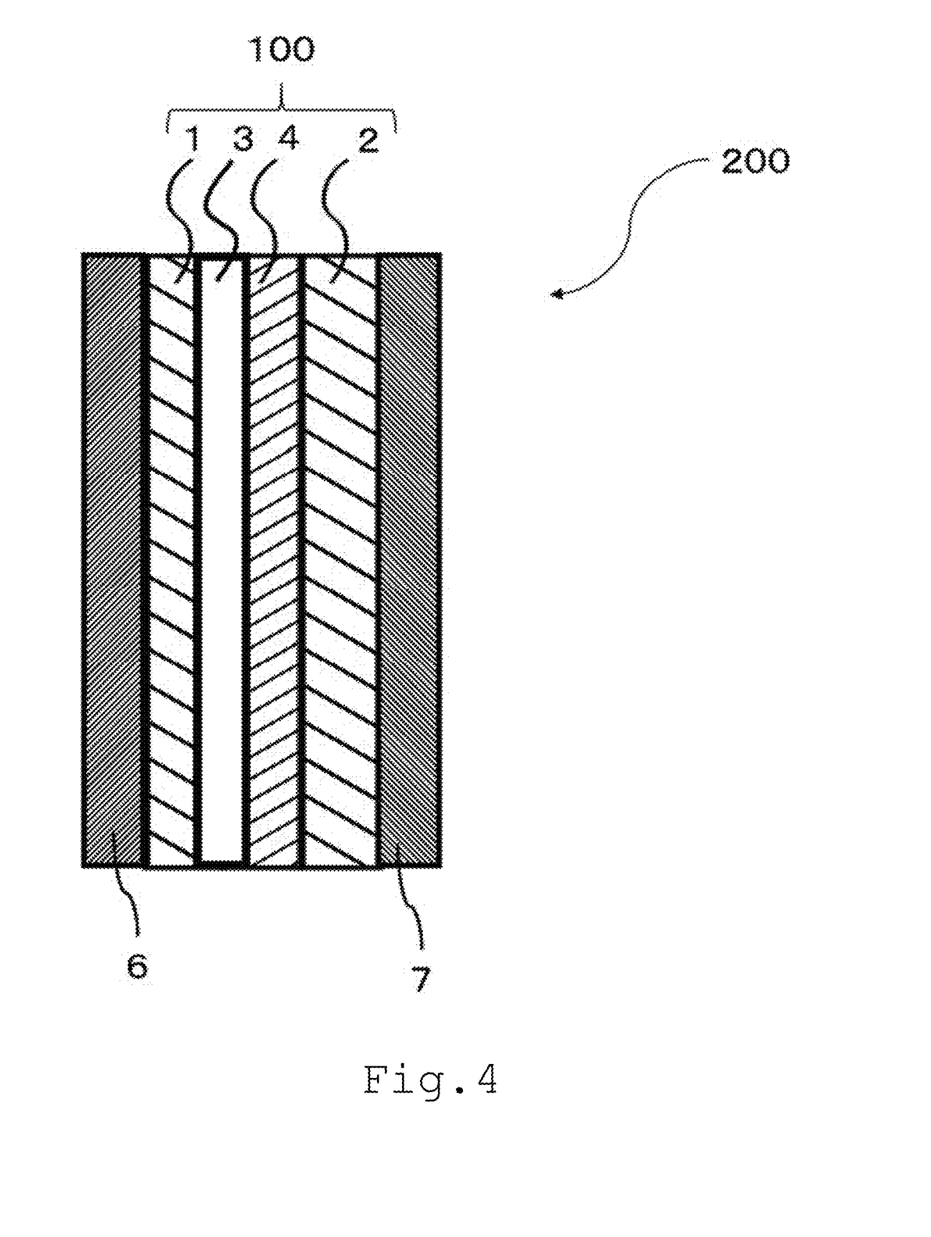
FIG. 4 is a sectional view of a membrane electrode assembly (MEA) according to a second embodiment.

FIG. 4 shows a sectional view of a membrane electrode assembly (MEA) 200 according to a second embodiment.

The membrane electrode assembly 200 according to the second embodiment includes a first electrode 6, a second electrode 7, and the laminated electrolyte membrane 100. When the membrane electrode assembly 200 is used for water electrolysis, the membrane resistance of the laminated electrolyte membrane is low, which is preferable from the viewpoint of low crossover.

The first electrode 6 is a cathode. The first electrode 6 has a first catalyst layer (not shown) including a catalyst that is in contact with the electrolyte membrane 1 for electrolyzing water and a support (not shown) that supports the first catalyst layer. The second electrode 7 is an anode. The second electrode 7 has a second catalyst layer (not shown) including a catalyst that is in contact with the electrolyte membrane 2 for electrolyzing water and a support (not shown) that supports the second catalyst layer (not shown). In addition, if the electrolyte membrane in contact with the second electrode (anode) 7 is a perfluorosulfonic acid based electrolyte membrane, the chemical durability of radicals and the like increases, which is desirable. The first and second catalyst layers may use the same catalyst or different catalysts and at least one of the first and second catalyst layers is preferably a laminated structure such as the nanosheet laminated catalyst layer 3. When a laminated structure is used, the gas shielding ratio of hydrogen, oxygen, and the like is further improved and crossover is reduced. The first and second catalyst layers are formed of supported catalysts in which a catalyst is supported on the surface of a material such as carbon or conductive oxide as a support. Though the support hardly contributes to the main electrocatalytic reaction, the support can control the catalyst material such as improvement of the reaction area of the catalyst material and can also improve the vacancy structure, electric conductivity, ion conductivity, and the like.

The catalyst material of the first and second catalyst layers contains at least one selected from a group including noble metal elements such as Pt, Ru, Rh, Os, Ir, Pd, and Au. Such catalyst materials are excellent in catalytic activity, conductivity, and stability. The above noble metals may be used as an oxide, or may be a composite oxide or a mixed oxide containing two or more metals.

The optimum noble metal element can be appropriately selected according to the reaction in which the membrane electrode assembly 200 is used.

For example, when a hydrogen production reaction is required as a cathode for water electrolysis, a catalyst having the composition represented by $Pt_uM_{1-u}$ is desirable. Here, u is in the range of $0<u\leq1$ and the element M is at least one selected from a group including Co, Ni, Fe, Mn, Ta, N, Hf, Si, Mo, Ti, Zr, Nb, V, Cr, Al, and Sn. In this catalyst, Pt of more than 0 atom % and 90 atom % or less and the element M of 10 atom % or more and less than 100 atom % are contained.

On the other hand, when an oxidation reaction of water (oxygen generation reaction) is required as an anode for water electrolysis, an oxide catalyst containing at least Ir, an oxide catalyst containing at least one of Pt, Ru, and Ir, a metal catalyst containing any one of Pt, Ru, and Ir, or an alloy catalyst containing any one of Pt, Ru, and Ir is desirable. As the oxide catalyst, for example, a catalyst having the composition represented by $Ir_zM_{1-z}O$ can be cited. Here, z is $0.5<z$ and the element M is at least one selected from a group including Co, Ni, Fe, Mn, Ta, N, Hf, Si, Mo, Ti, Zr, Nb, V, Cr, Sr, and Sn. When considering only metal component elements, the oxide catalyst contains the element M of 0 atom % or more and less than 50 atom % of 50 atom % or more. As specific oxide catalysts, at least one oxide catalyst selected from a group including $IrO_2$, $RuO_2$, $IrRu_xO_y$, $IrNi_xO_y$, $IrSr_xO_y$, and $IrRu_xNi_yO_z$, containing one or more metals out of Pt, Ru, and Ir and arbitrarily one or more elements M may be cited, but the anode catalyst of the membrane electrode assembly 200 in the embodiment is not limited thereto.

The membrane electrode assembly 200 is produced by bonding the first electrode 6 and the second electrode 7 to the laminated electrolyte membrane 100. In general, the first catalyst layer and the laminated electrolyte membrane 100 are bonded by heating and pressurizing. In this case, when the support for forming the first and second catalyst layers is a gas diffusion layer, the membrane electrode assembly 200 is obtained by laminating and bonding as shown in FIG. 4 across the laminated electrolyte membrane 100 using the support including the first and second catalyst layers.

When the support for forming the first and second catalyst layers is a transfer substrate, the first and second catalyst layers are first transferred from the transfer substrate to the laminated electrolyte membrane 100 to produce a catalyst coated membrane (CCM) and two CCMs are laminated across a gas diffusion support as shown in FIG. 4, heated, and pressurized to obtain the membrane electrode assembly 200. Alternatively, after transferring at least one of the first and second catalyst layers to the laminated electrolyte membrane 100, a gas diffusion layer may be arranged thereon. These layers are laminated as shown in FIG. 4 and bonded together by heating and pressurization to obtain the membrane electrode assembly 200.

In the membrane electrode assembly 200 according to the embodiment, the electrolyte membrane 1 and the first electrode 6, and the electrolyte membrane 2 and the second electrode 7 are bonded, and the nanosheet laminated catalyst layer 3 and the electrodes 6 and 7 are separated. Because the connectivity of the electrolyte membranes 1 and 2 with the electrodes 6 and 7 is higher than that of the nanosheet laminated catalyst layer 3, when the membrane electrode assembly 200 is used for water electrolysis, separation is less likely in water.

Third Embodiment

Figure 5:
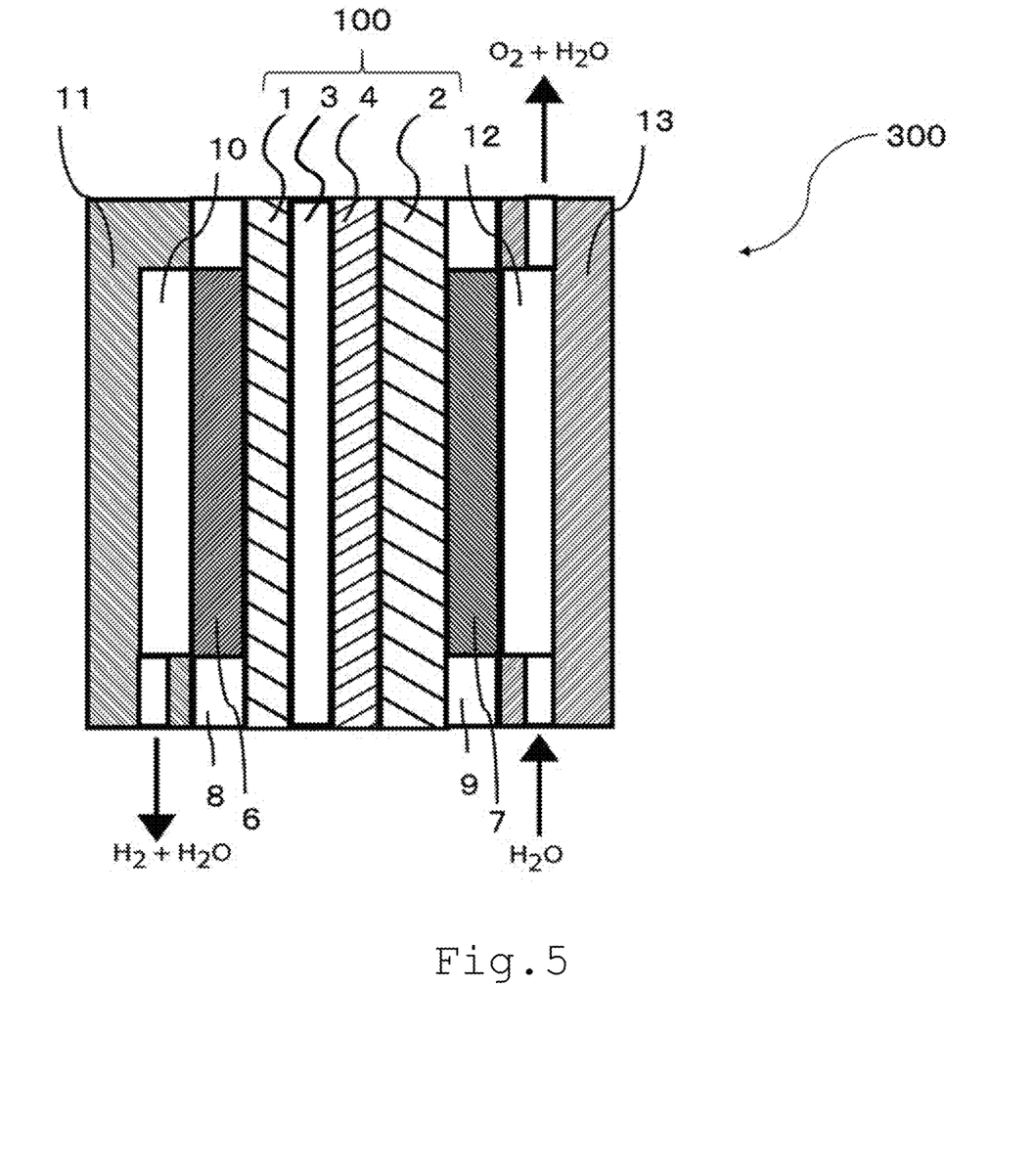
FIG. 5 is a sectional view of a water electrolysis cell according to a third embodiment.

FIG. 5 shows a sectional view of a water electrolysis cell 300 according to a third embodiment.

As shown in FIG. 5, the water electrolysis cell 300 according to the third embodiment includes the membrane electrode assembly 200, the first electrode (cathode) 6, the second electrode (anode) 7, the laminated electrolyte membrane 100, a cathode power feeder 10, a separator 11, an anode power feeder 12, a separator 13, a gasket (seal) 8, and a gasket (seal) 9. The cathode power feeder 10 and the anode power feeder 12 may be any body that can conduct gas and water. Further, the power feeders 10 and 12 may be integrated with the separators 11 and 13. More specifically, the separator may have a flow path through which water or a gas flows or may be one having a porous body, but the separator is not limited thereto. When the membrane electrode assembly 200 is used for water electrolysis, the water electrolysis cell 300 using the laminated electrolyte membrane 100 according to the embodiment has a low membrane resistance of the laminated electrolyte membrane and low crossover so that water electrolysis can be performed highly efficiently, which is preferable.

In the water electrolysis cell 300 of FIG. 5, an electrode (not shown) connects the cathode power feeder 10 and the anode power feeder 12, and a reaction occurs in the cathode and the anode. Water is supplied to the anode, and water is decomposed into protons, oxygen, and electrons in the anode electrode. The support of the electrode and the power feeder are porous bodies, and the porous bodies function as a flow path plate. The generated water and unreacted water are discharged, and protons and electrons are used for a cathode reaction. In the cathode reaction, protons and electrons react to produce hydrogen. Either one or both of the generated hydrogen and oxygen are used, for example, as fuel for a fuel cell. The membrane electrode assembly 200 is held by the separators 11 and 13, and airtightness is maintained by the gaskets (seals) 8 and 9.

Fourth Embodiment

Figure 6:
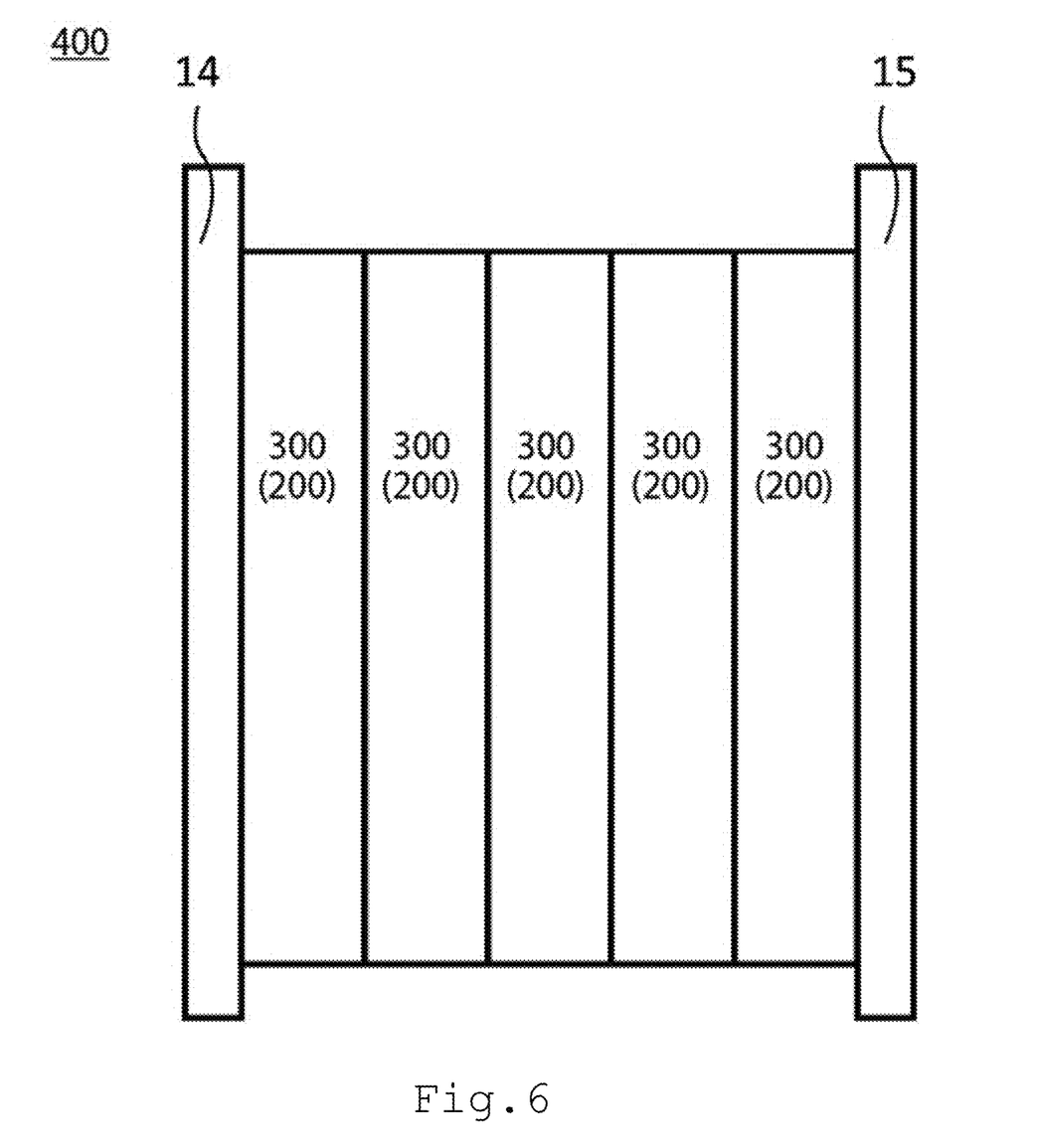
FIG. 6 is a diagram showing a stack according to a fourth embodiment.

FIG. 6 is a diagram showing a stack according to a fourth embodiment.

In a stack 400 according to the fourth embodiment shown in FIG. 6, a plurality of membrane electrode assemblies 200 or a plurality of water electrolysis cells 300 is connected in series. Clamping plates 14 and 15 are attached to both ends of the water electrolysis cell.

The voltage by one MEA 200 or water electrolysis cell 300 is low and thus, a high voltage can be obtained by constructing the stack 400 in which a plurality of MEAs 200 or water electrolysis cells 300 is connected in series. A water electrolysis cell 300 having only single MEA 200 can generate only small amount of hydrogen. The stack 400 having water electrolysis cells 300 connected in series can generate large amount of hydrogen.

Fifth Embodiment

Figure 7:
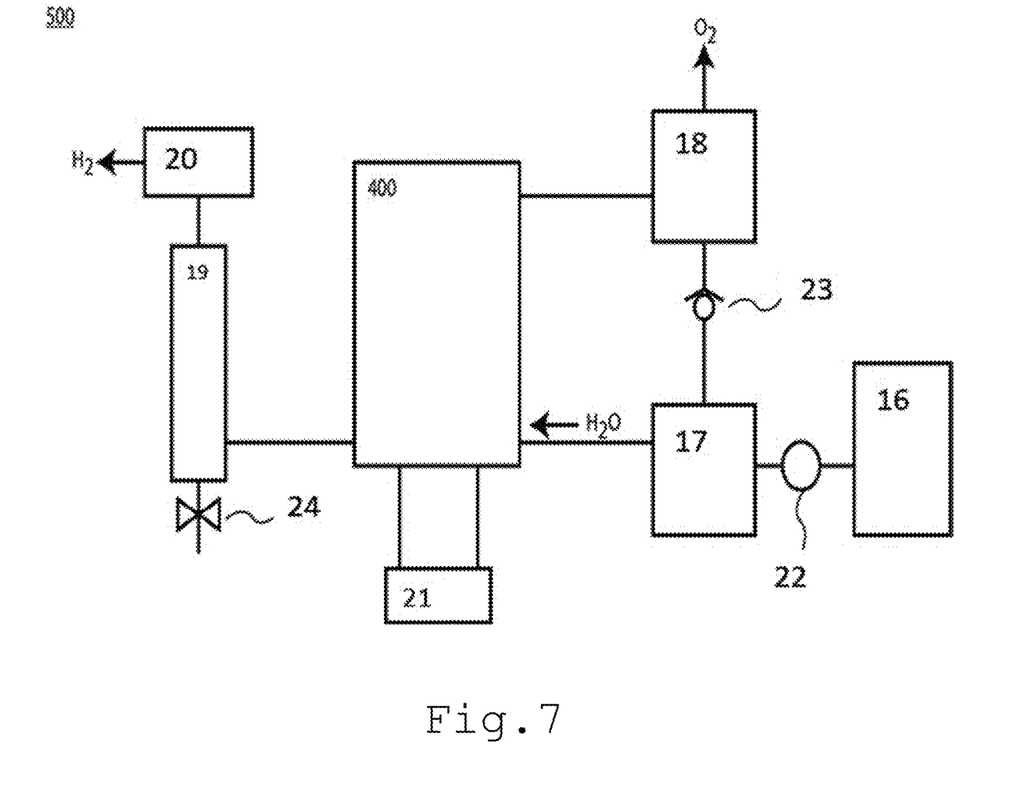
FIG. 7 is a diagram showing a water electrolyzer according to a fifth embodiment.

FIG. 7 is a diagram showing a water electrolyzer according to a fifth embodiment.

In the fifth embodiment, the stack 400 is used for a water electrolyzer 500. As shown in FIG. 7, water electrolysis single cells laminated in series are used as the stack 400 for water electrolysis. A power supply 21 is attached to the stack 400 for water electrolysis, and a voltage is applied between the anode and the cathode. A gas-liquid separator 18 for separating generated gas and unreacted water and a mixing tank 17 are connected to the anode side of the stack 400 for water electrolysis and water is sent to the mixing tank 17 by a pump 22 from an ion exchanged water producing apparatus 16 that supplies water for mixing in the mixing tank 17 through a check valve 23 from the gas-liquid separator 18 before being circulated to the anode. Oxygen generated in the anode passes through the gas-liquid separator 18 so that an oxygen gas is obtained. On the other hand, a hydrogen purification device 19 is connected to the cathode side subsequent to a gas-liquid separator 20 to obtain high purity hydrogen. Impurities are discharged via a path having a valve 24 connected to the hydrogen purification device 19. In order to control the operating temperature in a stable manner, it is possible to control the heating of the stack and a mixing tank, the current density during thermal decomposition, and the like.

Sixth Embodiment

Figure 8:
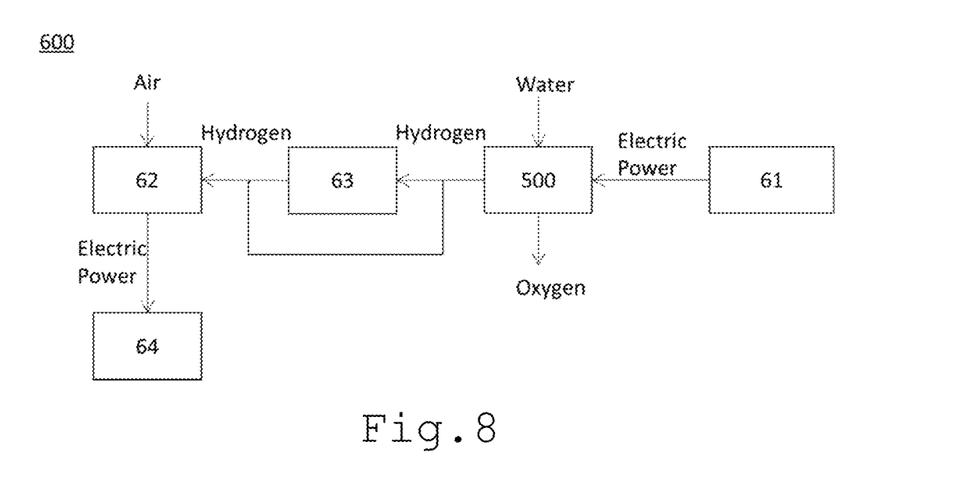
FIG. 8 is a diagram showing a hydrogen utilizing system according to a sixth embodiment.

FIG. 8 is a diagram showing a hydrogen utilizing system according to a sixth embodiment.

The water electrolyzer is used in the sixth embodiment. As shown in FIG. 8, electric power generated from power generator 61 such as solar power or wind power is transformed to hydrogen gas in the water electrolyzer. Additionally, hydrogen gas is directly supplied to a hydrogen generator 62 or is supplied to a hydrogen generator 62 via a hydrogen gas tank 63. Hydrogen gas is transformed to electrical power by reacting with air in the hydrogen generator 62, electrical power can be used in a drive unit 64 as electric power. For example, hydrogen gas turbine, fuel cell and the like can be used as the hydrogen generator 62. For example, car, home appliances, industrial equipment and the like can be used as the drive unit 64. By using the electrode according to this invention, the hydrogen utilizing system of sixth embodiment with low power and high durability can be built.

Seventh Embodiment

Figure 9:
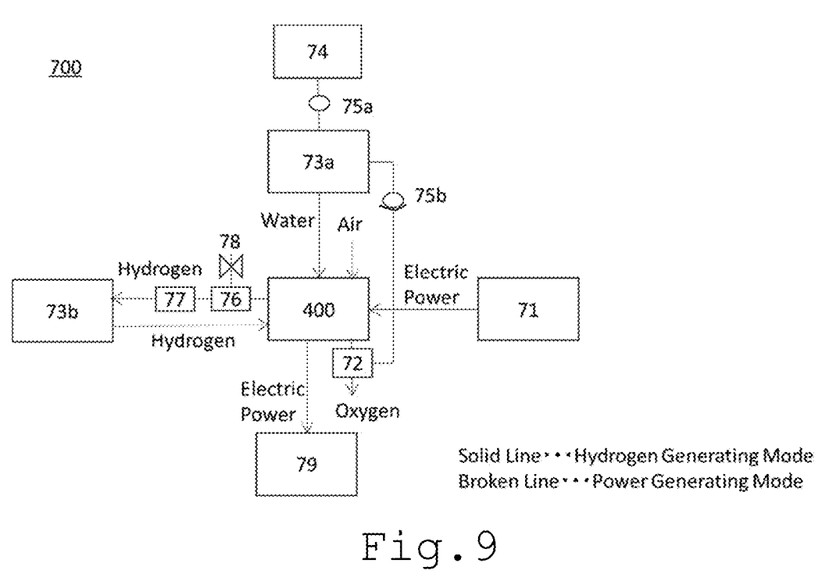
FIG. 9 is a diagram showing a hydrogen utilizing system according to a seventh embodiment.

FIG. 9 is a diagram showing a hydrogen utilizing system according to a sixth embodiment.

In the seventh embodiment, a utilized regenerative fuel cell (URFC) that switches hydrogen production by water electrolysis and power generation is equipped. The water electrolysis stack 400 can be used as the utilized regenerative fuel cell. As shown in FIG. 8, water electrolysis cells stacked in series are used as the water electrolysis stack 400. A power generator 71 such as solar power generator, wind power generator, and the like is attached to the water electrolysis stack 400. Voltage is applied between anode and cathode in a hydrogen generating mode. At the anode part, the water electrolysis stack 400 is connected to a gas-liquid separator 72 and a mixing tank 73a that separate generated gas and non-reacted water. Water is sent to mixing tank 73a from an ion exchanged water producing apparatus 74 that sent water using a pump 75a. And water passes a check bulb 75b from the gas-liquid separator 72, water is mixed in the mixing tank 73a, and water is circulated into the anode. Oxygen generated at anode passes the gas-liquid separator 72, and oxygen gas is obtained. At the cathode side, the water electrolysis stack 400 is connected to a gas-liquid separator 76 with a hydrogen purification device 77 and generates high purity hydrogen gas. The high purity hydrogen gas is stocked in a hydrogen gas tank 73b. Impurity material is discharged via a line including a bulb 78 connected to a gas-liquid separator 76.

The high purity hydrogen gas stocked in the hydrogen gas tank 73b is supplied to the water electrolysis stack 400 and reacts with outside air in a power generating mode. The high purity hydrogen gas is transformed in to electric power with such fuel cell reaction, electric power can be used for a drive unit 79. For example, car, home appliances, industrial equipment and the like can be used as the drive unit 79. By using the electrode according to this invention, the hydrogen utilizing system of seventh embodiment being compact size with low power and high durability can be built.

Hereinafter, the present disclosure will be described in detail as examples.

Examples 1 to 16 and Comparative Examples 1 to 4

(Preparation of Coating Solution for Transfer)

Ethanol was added to a predetermined amount of a fluorine-based electrolyte dispersion (20% nafion dispersion solution, manufactured by DuPont) in a polyethylene pot, predetermined amounts of a binder and inorganic nanoparticles were added, and 40 zirconia balls (diameter: 5 mm) were added and dispersed for 90 minutes with a paint shaker to prepare a coating solution for the transfer layer 4. The compositions of the prepared coating solutions are shown in S1 to S7 of Table 1.

TABLE 1

| Coating Solution No. | Binder solution | |
|---|---|---|
| | Binder solution name | Addition amount (g) |
| S1 | 1% PBI dimethylacetamide solution | 1.00 |
| S2 | 1% PBI dimethylacetamide solution | 1.00 |
| S3 | 1% PBI dimethylacetamide solution | 1.00 |
| S4 | 20% nafion solution | 0.05 |
| S5 | 20% nafion solution | 0.05 |
| S6 | 20% nafion solution | 0.05 |
| S7 | 20% nafion solution | 0.05 |

| Coating Solution No. | Inorganic nanomaterial | |
|---|---|---|
| | Type | Addition amount (g) |
| S1 | Ketchen black EC 300 J | 0.05 |
| S2 | CeO2 (manufactured by TECNAN) | 0.05 |
| S3 | TiO2 (Super-Titania F-6, manufactured by Showa Denko K.K.) | 0.05 |
| S4 | Ketchen black EC 300 J | 0.05 |
| S5 | CeO2 (manufactured by TECNAN) | 0.05 |
| S6 | TiO2 (Super-Titania F-6, manufactured by Showa Denko K.K.) | 0.05 |
| S7 | 5% WO3/TiO2 | 0.05 |

(Preparation of 5% $WO_3/TiO_2$ Super Strong Acid Oxide)

An aqueous solution in which tungsten oxide (manufactured by Wako Pure Chemical Industries, ltd.) $WO_3$ was dissolved in an ammonia aqueous solution (Wako Pure Chemical Industries, ltd., 15% aqueous solution) was prepared. The aqueous solution and a dispersion liquid prepared by dispersing titanium oxide $TiO_2$ (Super-Titania F-6, manufactured by Showa Denko K.K.) in water were mixed. The mixture was evaporated to dryness at 80° C. to carry ammonium tungstate on $TiO_2$. After drying the obtained precursor at 100° C. for 6 hours, the precursor was calcined at 700° C. for 4 hours to obtain $WO_3/TiO_2$ by thermally decomposing ammonium tungstate. The composition of $WO_3/TiO_2$ was 5/95 by weight ratio.

A dispersion liquid for composite membrane was applied by spraying with 15.0 g of the transfer layer 4 solution prepared above on a Kapton film (50 μm) (a drum Kapton film having a diameter of 15 cm and a width of 10 cm was set, the drum was rotated at about 550 rpm, and a spray portion was reciprocated at intervals of the width of 10 cm for coating), dried at 60° C. for 10 minutes and then dried at 160° C. for 10 minutes to produce the transfer layer 4.

(Production of Transfer Layer 4 Catalyst)

Various metal catalysts of Pt, PtCo, PtNi, and PtCoNi and a gap agent were alternately sputtered onto the transfer layer 4 and then, the sputtering product was etched with acid, washed with water, and dried by heating to produce transfer layer 4 catalysts. Table 2 shows the amount of platinum loading in the Pt and Pt alloy catalysts.

(Production of Preparations M1 to 15 of Laminated Electrolyte Membrane 100)

The electrolyte membrane 1 was placed on the transfer layer 4 produced above and transferred by hot pressing (160° C., 5 minutes, 12.5 kg/cm²), Kapton was peeled off, the nanosheet laminated catalyst layer 3 was transferred and then, the electrolyte membrane 2 was placed on the transfer layer 4 and hot pressed under the same conditions to produce laminated electrolyte membranes M1 to M14.

However, the laminated electrolyte membrane M15 was produced, after transferring the nanosheet laminated catalyst layer 3, by applying a solution to be 1% nafion by the above spray coating method, drying the solution at 60° C. for 10 minutes, and hot pressing (160° C., 5 Min, 12.5 kg/cm²). The electrolyte membrane 2 was 5 Um thick. A detailed configuration is shown in Table 2.

(Production of Preparation M16 of Laminated Electrolyte Membrane 100)

A PtCo metal catalyst and a gap agent were alternately sputtered onto glass fiber filter paper (GC-50, 190 μm manufactured by ADVANTEC) and then, the sputtering product was etched with acid, washed with water, and dried by heating to produce the preparation M16. The platinum loading amount in the PtCo catalyst is shown in Table 2.

The above glass fiber filter paper with a catalyst layer (with the catalyst layer above) was fixed onto a PTFE film and a solution of 25 wt's; Aquivion (d72-25BS) aqueous solution diluted to 5% with ethanol was sufficiently applied and dried at 60° C. for 10 minutes. Then, the glass fiber filter paper was pressed by hot pressing at 160° C. and a pressure of 10 kg/cm² for 5 minutes. After cooling, the glass fiber filter paper was removed from the PTFE film to obtain a membrane having a thickness of 200 μm. A solution of a 5 wt % Aquivion (d72-25BS) aqueous solution diluted to 5% with ethanol was further applied onto the PTFE film side during creation of the membrane to create a membrane of about 1 μm to produce the electrolyte membrane M16.

(Creation of Composite Electrolyte Membranes C1 to C3)

Comparative Example 1: Composite Electrolyte Membrane C-1

First, 0.625 g of platinum black (manufactured by TKK) and 10.0 g of water were added to a 50 ml polyethylene pot and stirred well and then, 7.50 g of ethanol and 7.50 g of IPA were added and further, 9.06 g of nafion solution was added. 40 zirconia balls (diameter: 5 mm) were added and dispersed for 90 minutes with a paint shaker to prepare a catalyst coating solution. While drying the catalyst dispersion liquid on a PTFE film (100 μm) set onto a drum (a drum having a diameter of 15 cm and a width of 10 cm) using a drier, the drum was rotated at about 550 rpm and a spray portion was reciprocated at intervals of the width of 10 cm for coating and then, the dispersion liquid was dried on a hot plate at 60° C. for 10 minutes and further dried at 130° C. for 10 minutes to produce a catalyst transfer layer. The thickness of the catalyst layer was about 10 μm and the Pt loading amount was 2.0 mg/cm'. Nafion 115 was placed on the catalyst transfer layer and transferred by hot pressing (160° C., 5 minutes, 12.5 kg/cm$^2$), and PTFE was peeled off to produce a composite electrolyte membrane C-1.

Comparative Example 2: Composite Electrolyte Membrane C-2

After nafion 115 was sufficiently swollen with water, one side thereof was masked with a PTFE film and nafion 115 was immersed in a 0.03 M Pt(NH$_3$)$_4$Cl$_2$ aqueous solution for 2 minutes to exchange cations, washed with water, then immersed in a 1% NaBH aqueous solution for 3 hours for reduction. After rinsing, nafion 115 was immersed in 10% nitric acid at 60 to 70° C. for about 1 hour, washed with ion exchanged water, further immersed in 10% nitric acid at 60 to 70° C. for about 1 hour, and washed with ion exchange water to produce an electrolyte membrane C-2 in which Pt was combined. The amount of Pt-loading in the membrane was 0.24 mg/cm$^2$.

Comparative Example 3: Composite Electrolyte Membrane C-3

Using the electrolyte membrane nafion 212, similarly to Comparative Example 2, an electrolyte membrane in which Pt was combined was produced. Nafion 212 was thermocompression bonded by hot pressing (160° C., 5 minutes, 12.5 kg/cm$^2$) onto a surface not combined with Pt while the membrane was sufficiently swollen with water to produce a composite electrolyte membrane C-3. The Pt-loading amount was 0.24 mg/cm$^2$.

(Production of Anode Electrode)

The anode electrode was prepared by alternate reactive sputtering of IrNi$_x$O$_y$ and a gap agent on a 200 μm-thick titanium porous body to produce a laminated structure and then, etching the laminated structure by acid treatment and drying by heating before heating at 435° C. for 1 hour. The IrNi$_x$O$_y$ catalyst layer has an Ir amount of 0.12 mg/cm$^2$ (22 layers).

(Production of Cathode Electrode)

PtCo and a gap agent were alternately sputtered onto carbon paper with a cathode electrode MPL (microporous layer), etched with acid, washed with water, dried by heating, and heated at 350° C. for 1 hour. The PtCo alloy catalyst has a platinum amount of 0.14 mg/cm$^2$ (28 layers).

(Production of Membrane Electrode Assembly)

Examples 1 to 16

The anode electrode and the cathode electrode are each cut to 20 mm square each. The anode electrode, the laminated electrolyte membranes M 1 to M 15, and the cathode electrode were sequentially stacked and crimped by hot pressing (12.5 kg/cm$^2$, 165° C., 4 min), and cooled to room temperature to produce an MEA. The results are shown in Table 2. However, the electrolyte membrane 1 side was arranged on the cathode side and produced Comparative Examples 1 to 4

MEA (Comparative Examples 1 to 4) was produced in the same manner as the above MEA production conditions and using nafion 115 and the composite electrolyte membranes C1 to C3 for the membrane. The results are shown in Table 2.

(Evaluation of Water Electrolysis Performance)

A titanium water electrolysis cell used a titanium flow path plate as a current feeder (integral with a separator) of an anode and a cathode and used a unit cell (anode & cathode; straight flow path) with an electrode area of 4 cm$^2$. The cell temperature was 80° C. at atmospheric pressure, the cell was heated with a heater so as to maintain the temperature, and ion-exchanged water was used by circulating several times the amount of water required for water decomposition to the anode. Water electrolysis was carried out at a cell temperature of 80° C. using an electronic load apparatus manufactured by Kikusui Electronics Corp. at a current density of 2 A/cm$^2$ for water decomposition. The decomposition voltage of water and the AC impedance resistance at 1 KHz were measured and the results are shown in Table 2.

(Measurement of Hydrogen Crossover)

Water decomposition was carried out at the constant current of the above water electrolysis conditions, water was separated from the gas coming out from the anode side and collected for 30 minutes, and the hydrogen concentration was measured by GC-MS. The measurement was made after 50 hours and after 500 hours, and the measurement results are shown in Table 2.

TABLE 2

| MEA sample name | Laminated composite electrolyte membrane | Catalyst | Transfer layer solution | Transfer layer thickness μm |
|---|---|---|---|---|
| Example 1 | M1 | PtCoNi | S1 | 5 |
| Example 2 | M2 | PtCoNi | S2 | 10 |
| Example 3 | M3 | PtCo | S3 | 8 |
| Example 4 | M4 | PtCo | S3 | 7 |
| Example 5 | M5 | Pt | S4 | 1 |
| Example 6 | M6 | Pt | S1 | 5 |
| Example 7 | M7 | PtNi | S2 | 3 |
| Example 8 | M8 | PtCo | S1 | 4 |
| Example 9 | M9 | PtCo | 1% nafion | 1 |
| Example 10 | M10 | PtCo | S4 | 1 |
| Example 11 | M11 | PtCo | S5 | 2 |
| Example 12 | M12 | PtCo | S6 | 2 |
| Example 13 | M13 | PtCo | S7 | 3 |
| Example 14 | M14 | PtCo | S4 | 1 |
| Example 15 | M15 | PtCo | S4 | 1 |
| Example 16 | M16 | PtCo | None | None |
| Comparative Example 1 | nafion115 | PtCo | None | None |
| Comparative Example 2 | C1 | Pt | None | None |
| Comparative Example 3 | C2 | Pt | None | None |
| Comparative Example 4 | C3 | Pt | None | None |

| MEA sample name | Composite electrolyte membrane composition (electrolyte membrane 1/catalyst•transfer layer/electrolyte membrane 2) | Pt-loading (mg/cm$^2$) |
|---|---|---|
| Example 1 | nafion 212/catalyst•transfer layer/nafion 212 | 0.12 |
| Example 2 | nafion 212/catalyst•transfer layer/nafion 212 | 0.10 |
| Example 3 | nation 212/catalyst•transfer layer/nafion 212 | 0.11 |
| Example 4 | aquvion E87-05s/catalyst•transfer layer/aquvion E87-05S | 0.10 |
| Example 5 | aquvion E87-05s/catalyst•transfer layer/aquvion E87-05S | 0.11 |
| Example 6 | nafion 212/catalyst•transfer layer/nafion 212 | 0.12 |
| Example 7 | aquvion E87-05s/catalyst•transfer layer/aquvion E87-05S | 0.12 |

TABLE 2-continued

| | | |
|---|---|---|
| Example 8 | nafion 212/catalyst•transfer layer/nafion 212 | 0.24 |
| Example 9 | nafion 212/catalyst•transfer layer/nafion 212 | 0.12 |
| Example 10 | nafion 212/catalyst•transfer layer/nafion 212 | 0.07 |
| Example 11 | nafion 212/catalyst•transfer layer/nafion 212 | 0.10 |
| Example 12 | nafion 212/catalyst•transfer layer/nafion 212 | 0.08 |
| Example 13 | nafion 212/catalyst•transfer layer/nafion 212 | 0.09 |
| Example 14 | nafion 1135/catalyst•transfer layer/nafion HP (anode side) | 0.01 |
| Example 15 | nafion 115/catalyst•transfer layer/nafion coating film (5 μm, anode side) | 0.09 |
| Example 16 | Aquivion (glass fiber filter paper: about 190 μm)/catalyst layer/Aquivion (10 μm) | 0.12 |
| Comparative Example 1 | nafion 115 (no treatment) | 0.00 |
| Comparative Example 2 | nafion 115/Pt particle catalyst layer (10 μm, anode side) | 2.00 |
| Comparative Example 3 | nafion 115 intra-membrane Pt reduction type (anode side) | 0.24 |
| Comparative Example 4 | nafion 212/nafion 212 intra-membrane Pt reduction type (anode side) | 0.24 |

| MEA sample name | When current density is 2 A/cm$^2$ | | H$_2$ crossover amount (ppm) | |
|---|---|---|---|---|
| | Voltage (V) | Resistance (mΩ) | After 50 h | After 500 h |
| Example 1 | 1.831 | 26.7 | 326 | 340 |
| Example 2 | 1.817 | 25.4 | 325 | 387 |
| Example 3 | 1.805 | 24.8 | 310 | 315 |
| Example 4 | 1.794 | 24.7 | 308 | 318 |
| Example 5 | 1.793 | 24.6 | 300 | 307 |
| Example 6 | 1.833 | 26.8 | 326 | 340 |
| Example 7 | 1.798 | 24.9 | 320 | 315 |
| Example 8 | 1.835 | 2.88 | 190 | 195 |
| Example 9 | 1.802 | 25.1 | 345 | 353 |
| Example 10 | 1.815 | 25.2 | 330 | 345 |
| Example 11 | 1.822 | 25.9 | 329 | 333 |
| Example 12 | 1.820 | 25.8 | 362 | 370 |
| Example 13 | 1.808 | 25.0 | 354 | 367 |
| Example 14 | 1.803 | 24.8 | 300 | 308 |
| Example 15 | 1.820 | 26.1 | 280 | 292 |
| Example 16 | 1.832 | 26.5 | 92 | 98 |
| Comparative Example 1 | 1.820 | 26.0 | 8000 | 12500 |
| Comparative Example 2 | 1.835 | 26.6 | 1500 | 6800 |
| Comparative Example 3 | 1.818 | 25.8 | 200 | 570 |
| Comparative Example 4 | 1.820 | 25.9 | 300 | 790 |

Compared with Comparative Example 4 using nafion 115 used standardly for PEM type water electrolysis, the MEA using the laminated electrolyte membrane has a significantly low crossover, the resistance hardly increases, and the voltage is also low, resulting in high efficiency, in all cases. Further, in Comparative Examples 5 to 7 (composite electrolyte membrane in which Pt is dispersed in the membrane), the crossover can be reduced in the initial stage, but after 500 hours, the crossover is twice or more, leading to a large increase. However, with the MEA using the laminated electrolyte membrane 100, the crossover increases only by about 20% at the maximum in 500 hours. Therefore, an MEA with small crossover and low membrane resistance was obtained.

Here, some elements are expressed only by element symbols thereof.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A laminated electrolyte membrane comprising:
a first electrolyte membrane;
a second electrolyte membrane; and
a nanosheet laminated catalyst layer provided between the first electrolyte membrane and the second electrolyte membrane and including a laminated structure in which a plurality of nanosheet catalysts is laminated with a gap, and a transfer layer between the second electrolyte membrane and the nanosheet laminated catalyst layer,
wherein
the nanosheet laminated catalyst layer has a thickness of 10 nm or more and 2000 nm or less,
the transfer layer comprises at least one selected from the group consisting of a perfluorosulfonic acid based polymer, a polybenzothiazole polymer, a polybenzoxazole polymer, and a polybenzoimidazole polymer,
the nanosheet laminated catalyst layer is in direct contact with the first electrolyte membrane and the transfer layer, and
the transfer layer is in direct contact with the nanosheet laminated catalyst and the second electrolyte membrane.

2. The laminated electrolyte membrane according to claim 1, wherein the nanosheet catalyst contains Pt or a Pt alloy.

3. The laminated electrolyte membrane according to claim 1, wherein the laminated electrolyte membrane has a membrane thickness of 25 μm or more and 250 μm or less.

4. The laminated electrolyte membrane according to claim 1, wherein a radical scavenger or a hydrogen peroxide decomposer is added to the laminated electrolyte membrane.

5. The laminated electrolyte membrane according to claim 1, wherein porous carbon or ceramics containing fibrous carbon is contained in the gap.

6. The laminated electrolyte membrane according to claim 1, wherein a vacancy area ratio of the laminated structure is 50% or more and 90% or less.

7. The laminated electrode membrane according to claim 1, wherein the thickness of the nanosheet laminated catalyst layer with respect to a thickness of the laminated electrolyte membrane is 0.01/1000 to 0.5/1000.

8. The laminated electrode membrane according to claim 1, wherein a surface of the transfer layer is in direct contact with the nanosheet laminated catalyst layer, and
a surface of the transfer layer which is opposite to the surface of the transfer layer being in direct contact with the nanosheet laminated catalyst layer is in direct contact with the second electrolyte membrane.

9. A membrane electrode assembly, wherein a first electrode, a second electrode, and the laminated electrolyte membrane according to claim 1 between the first electrode and the second electrode are provided.

10. The membrane electrode assembly according to claim 9, wherein the first electrode is a cathode and the second electrode is an anode.

11. The membrane electrode assembly according to claim 10, wherein an electrolyte membrane in contact with the second electrode is a perfluorosulfonic acid based electrolyte membrane.

12. The membrane electrode assembly according to claim 9, wherein the nanosheet laminated catalyst layer and the first electrode or the second electrode are separated.

13. A water electrolysis cell using the membrane electrode assembly according to claim 9.

14. A stack using the membrane electrode assembly according to claim 9.

15. A stack using the water electrolysis cell according to claim 13.

16. A water electrolyzer using the membrane electrode assembly according to claim 9.

17. A water electrolyzer using the water electrolysis cell according to claim 13.

18. A water electrolyzer using the stack according to claim 14.

19. A water electrolyzer using the stack according to claim 15.

20. A hydrogen utilizing system using the water electrolyzer according to claim 19.

* * * * *